(12) United States Patent
Hashimoto et al.

(10) Patent No.: US 11,546,148 B2
(45) Date of Patent: Jan. 3, 2023

(54) INFORMATION PROCESSING DEVICE, INFORMATION PROCESSING SYSTEM, AND METHOD FOR CONTROLLING INFORMATION PROCESSING DEVICE INCLUDING COMPARING REQUEST ORDER INFORMATION AND ORDER COMPARISON INFORMATION

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Mikio Hashimoto, Bunkyo (JP); Atsushi Shimbo, Bunkyo (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 0 days.

(21) Appl. No.: 16/883,065

(22) Filed: May 26, 2020

(65) Prior Publication Data
US 2021/0091936 A1    Mar. 25, 2021

(30) Foreign Application Priority Data
Sep. 19, 2019 (JP) .............................. JP2019-170535

(51) Int. Cl.
*H04L 9/08* (2006.01)
*H04L 9/40* (2022.01)

(52) U.S. Cl.
CPC .......... *H04L 9/0861* (2013.01); *H04L 9/0825* (2013.01); *H04L 9/0894* (2013.01); *H04L 63/1466* (2013.01)

(58) Field of Classification Search
None
See application file for complete search history.

(56) References Cited

U.S. PATENT DOCUMENTS

| 6,539,092 B1 | 3/2003 | Kocher |
| 7,506,165 B2 * | 3/2009 | Kocher .................. G06F 7/723 705/65 |

(Continued)

FOREIGN PATENT DOCUMENTS

| JP | 2001-237824 A | 8/2001 |
| JP | 2005-295408 A | 10/2005 |

(Continued)

*Primary Examiner* — Bassam A Noaman
(74) *Attorney, Agent, or Firm* — Oblon, McClelland, Maier & Neustadt, L.L.P.

(57) ABSTRACT

An information processing device updates its own secret key according to an update request including request order information, the information processing device being provided with: a storage unit that stores, in a nonvolatile manner, a master secret key, a secret key, and order comparison information that enables comparison of the request order of the update request; and an update unit that, in a case where the update request has been made, compares the request order information and the order comparison information, and in a case where it has been determined that the order of the update request is authorized, updates the order comparison information to information corresponding to the request order information before update processing of the secret key is performed by using the master secret key.

9 Claims, 6 Drawing Sheets

(56) References Cited

U.S. PATENT DOCUMENTS

| | | |
|---|---|---|
| 7,664,260 B2 | 2/2010 | Futa et al. |
| 9,106,405 B1* | 8/2015 | Roth .................. H04L 9/0894 |
| 2012/0239937 A1* | 9/2012 | Yamanaka ............ H04L 9/0866 |
| | | 713/179 |
| 2017/0303175 A1* | 10/2017 | Chen ................ H04W 36/0088 |
| 2017/0359717 A1* | 12/2017 | Adler .................. H04L 9/0891 |
| 2018/0076958 A1* | 3/2018 | Narimoto .............. H04L 9/0877 |
| 2020/0193028 A1* | 6/2020 | Norem ................ G06F 21/572 |
| 2020/0195431 A1* | 6/2020 | Athmalingam ....... H04L 63/061 |

FOREIGN PATENT DOCUMENTS

| | | |
|---|---|---|
| JP | 4216475 B2 | 1/2009 |
| JP | 4544538 B2 | 9/2010 |
| JP | 2015-18667 A | 1/2015 |

\* cited by examiner ously updated.

INFORMATION PROCESSING DEVICE, INFORMATION PROCESSING SYSTEM, AND METHOD FOR CONTROLLING INFORMATION PROCESSING DEVICE INCLUDING COMPARING REQUEST ORDER INFORMATION AND ORDER COMPARISON INFORMATION

CROSS-REFERENCE TO RELATED APPLICATIONS

This application is based upon and claims the benefit of priority from Japanese Application No. 2019-170535, filed on Sep. 19, 2019, the entire contents of which are incorporated herein by reference.

FIELD

Embodiments described herein relate generally to an information processing device, an information processing system, and a method for controlling the information processing device.

BACKGROUND

Conventionally, a side-channel attack is known as an attack method in which by observing, by various physical means, an operation state of an information processing device such as a microcomputer that functions as an encryption processing device, secret information (for example, secret key information) in the device is obtained.

Specifically, for example, timing attacks aiming at processing time, power analysis attacks aiming at power consumption, and electromagnetic wave analysis attacks aiming at electromagnetic waves leaking from the device are known. Side channel attacks aim to extract the secret key for use in encryption or decryption processing.

As measures against these attacks, there are proposed, for example, a technique in which the power consumption per one encryption computation and the amount of information leakage caused by an electromagnetic wave are reduced to force an attacker to try a large number of times, and a technique in which a risk of key leakage is reduced by frequently updating a secret key.

However, the former technique results in a remarkable increase in hardware scale and a remarkable increase in throughput overhead, and the latter technique causes a problem that it is difficult to apply the technique to a system, such as a vehicle-mounted system, in which a secret key is not frequently updated.

An object of the present invention is to provide an information processing device that suppresses an increase in hardware scale, that can be applied to various kinds of systems, and that is easily capable of taking measures against a side-channel attack, and to provide an information processing system, and a method for controlling the information processing device.

DETAILED DESCRIPTION

An information processing device according to an embodiment updates its own secret key according to an update request including request order information, the information processing device being provided with: a storage unit that stores, in a nonvolatile manner, a master secret key, a secret key, and order comparison information that enables comparison of the order of the update request; and an update unit that, in a case where the update request has been made, compares the request order information and the order comparison information, and in a case where it has been determined that the order of the update request is authorized, updates the order comparison information to information corresponding to the request order information before update processing of the secret key is performed by using the master secret key.

Next, preferred embodiments will be explained below in detail with reference to the accompanying drawings.

Figure 1:
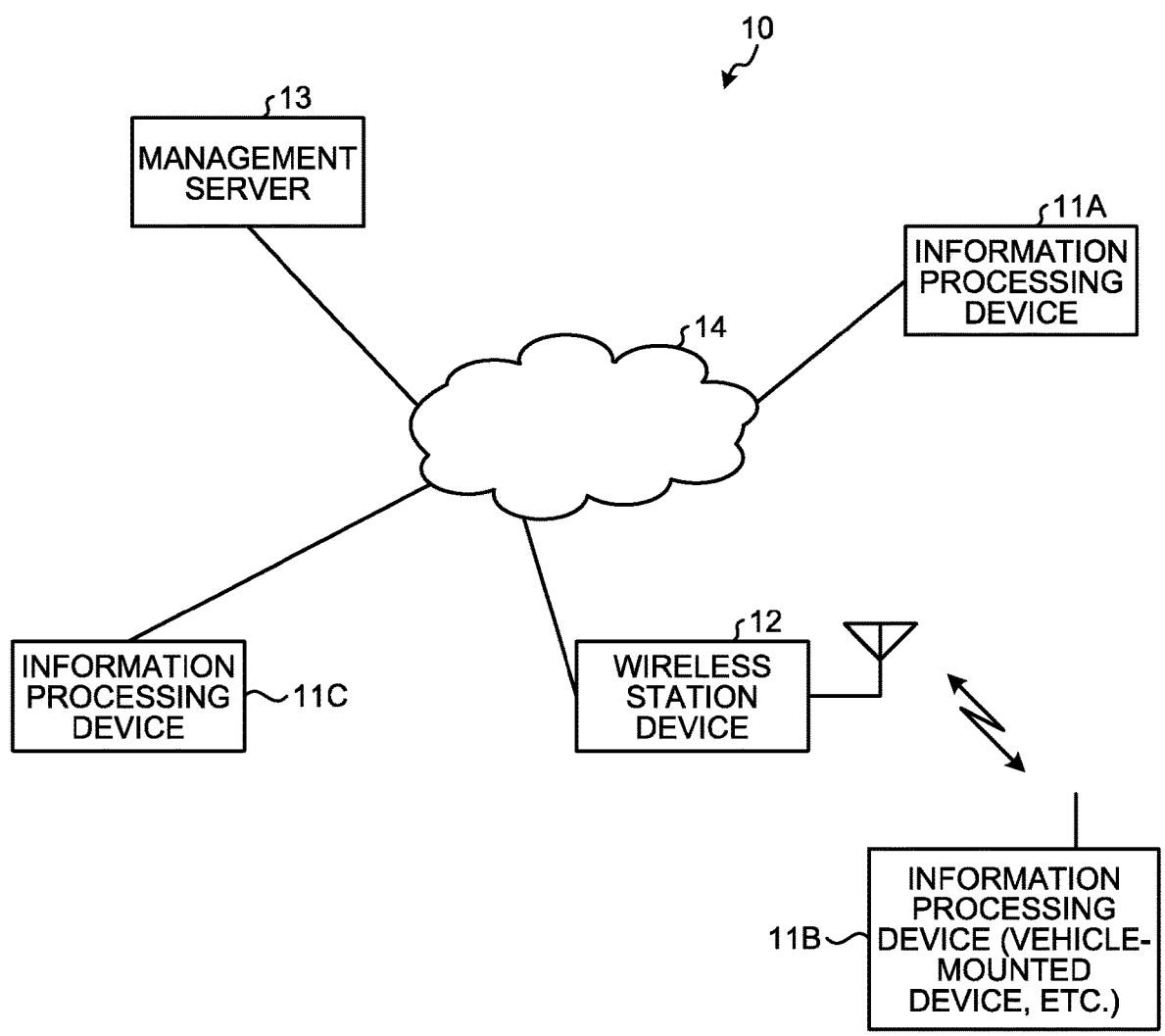
FIG. 1 is a block diagram illustrating a schematic configuration of an information processing system according to an embodiment.

FIG. 1 is a block diagram illustrating a schematic configuration of an information processing system according to an embodiment.

An information processing system 10 is provided with: a plurality of information processing devices 11A to 11C; a wireless station device 12 that wirelessly communicates with the information processing device 11B; and a management server 13 that manages the information processing devices 11A to 11C. Moreover, the information processing devices 11A, 11C, the wireless station device 12, and the management server 13 are communicably connected through a communication network 14 such as the Internet.

The information processing devices 11A and 11C differ from the information processing device 11B merely in that the information processing device 11B communicates through a wireless communication network. Basic configurations and operations of the information processing devices 11A to 11C are similar to one another. The information processing device 11B is configured as, for example, a vehicle-mounted apparatus. An explanation will be made below by taking the information processing device 11A as an example.

Figure 2:
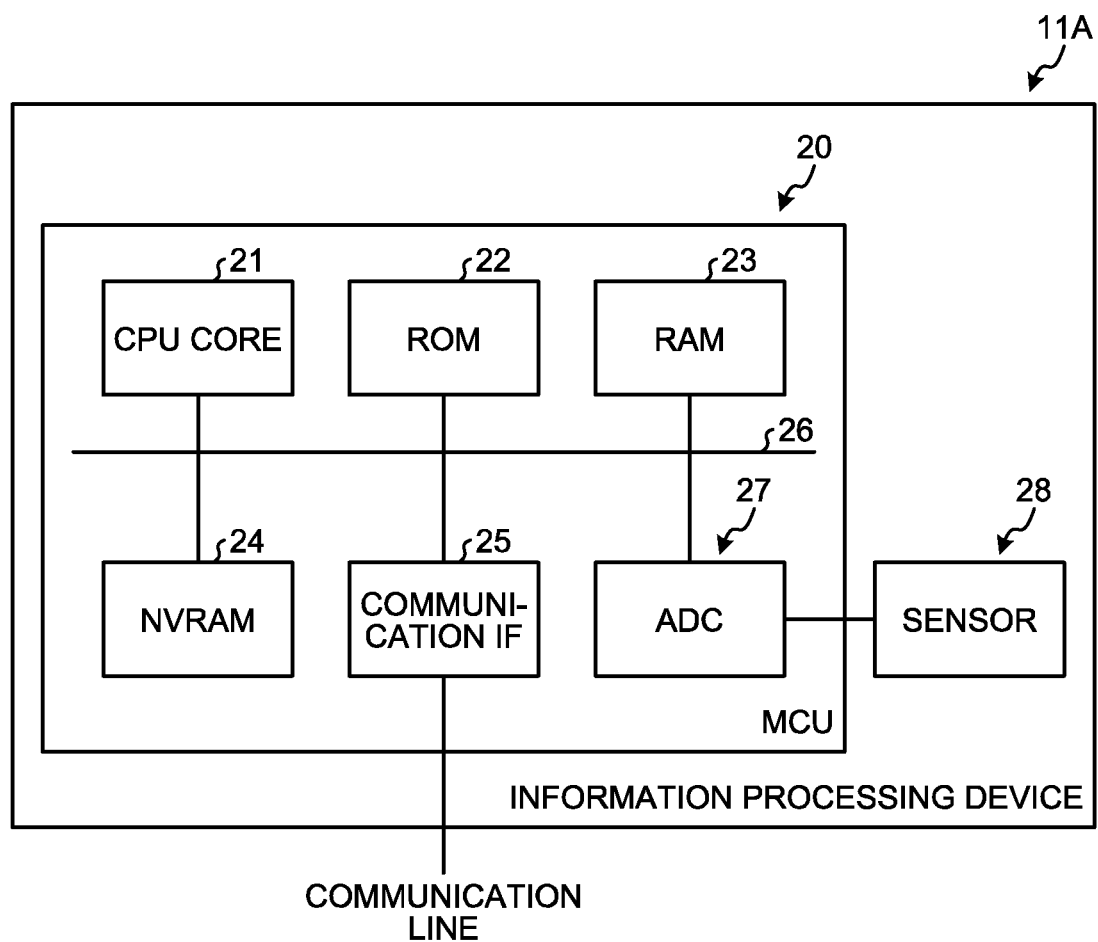
FIG. 2 is a block diagram illustrating a schematic configuration of an information processing device.

FIG. 2 is a block diagram illustrating a schematic configuration of an information processing device. Main functions of the information processing device 11A are performed by an MCU 20.

The MCU 20 is provided with: a CPU core 21 that totally controls the MCU 20; a ROM 22 that stores a program and the like; a RAM 23 that functions as a work table, and stores various data; an NVRAM 24 that stores a server public key, a master key, a communication secret key, an update request count value CT as order comparison information, and the like in a nonvolatile manner; and a communication interface (IF) 25 that performs communication interface operation. The MCU 20 is further provided with: a communication bus 26 that communicably connects each part; and a built-in analog to digital converter (ADC) 27. In addition, a sensor 28 is connected to input of the ADC 27.

Figure 3:
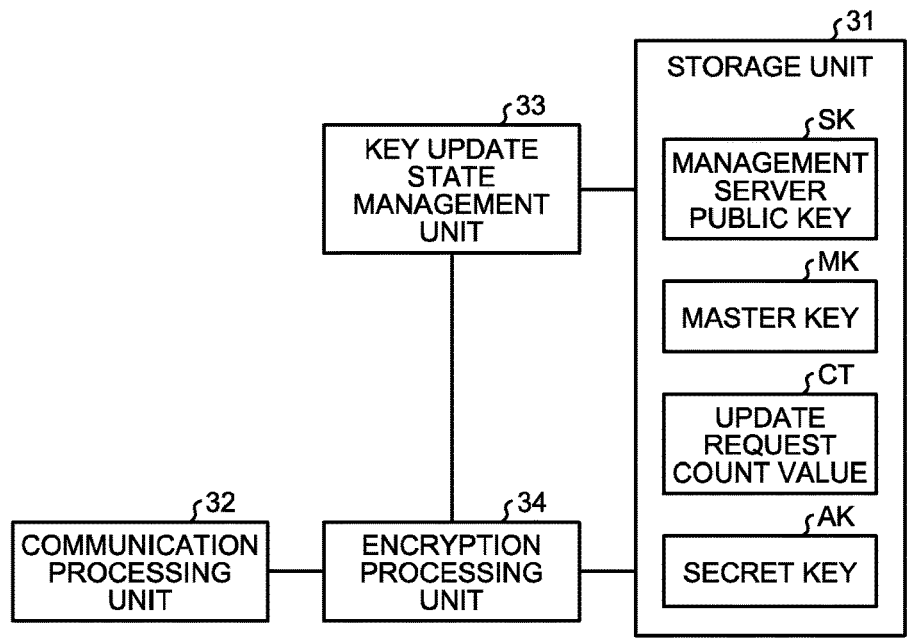
FIG. 3 is a block diagram illustrating a functional configuration of the information processing device.

FIG. 3 is a block diagram illustrating a logical functional configuration of key management and updating built into the MCU.

The MCU 20 is provided with: a storage unit (NVRAM) 24 that stores a server public key SK, a master key MK, a communication secret key AK, an update request count value CT as order comparison information, and the like; a communication processing unit 32 that is connected to the communication bus 26; a key update state management unit 33 that manages a key update state of a secret key; and an encryption processing unit 34 that performs encryption processing and decryption processing.

First of all, problems of secret key update processing in the prior art will be described with reference to FIGS. 1 and 3.

In order to update a secret key, the management server 13 transmits an update request message (update request data) to the information processing devices 11A to 11C through the communication network 14 in appropriate timings respectively.

The update request message includes update order data (Cr) indicating the number of times (including this time) an update request has been made to each of the information processing devices 11A to 11C; and the update request message is provided with a signature by using a secret key of public key system encryption of the management server 13.

Consequently, the information processing devices 11A to 11C that have received the encrypted update request message verify the signature of the update request message by using the management server public key SK of the management server 13.

Subsequently, in a case where the verification of the signature has been successfully completed, the information processing devices 11A to 11C cause the encryption processing unit 34 to decrypt the update request message by using the master key MK, and store the newly decrypted secret key AK in the storage unit 31.

Subsequently, the information processing devices 11A to 11C update the update request count value CT by the update order data (Cr), and end the processing. Specifically, in a case where the update request message last time has been, for example, the 25th update request, the update request count value CT is "25". Since update order data (Cr) included in the update request message this time is "26", the update request count value CT is updated to "26", and then the processing ends.

Incidentally, the processing described above is based on an assumption that the processing has normally ended. However, in a case where a side-channel attacker obtains side-channel information at the time of decryption processing of a secret key, and after the decryption processing, in a case where power supply has been shut off before the update request count value CT is updated, the update request count value CT is the same as that before the update request. This results in a state in which the processing of the update request has not yet been completed. Therefore, if there is no limit, processing for an update request can be performed a plurality of times. In other words, side-channel information can be obtained a plurality of times, and thus there was an increased possibility that a side-channel attack would succeed.

In view of this, in an embodiment, one update request message is subjected to secret-key decryption processing only once, thereby reducing feasibility of side-channel attacks so as to ensure security.

Next, operation in the embodiment will be described.

First of all, processing performed when updating of the information processing system has been successfully completed will be described. The description below will be made taking as example a case where a target information processing device of an update request of a secret key is the information processing device 11A.

Figure 4:
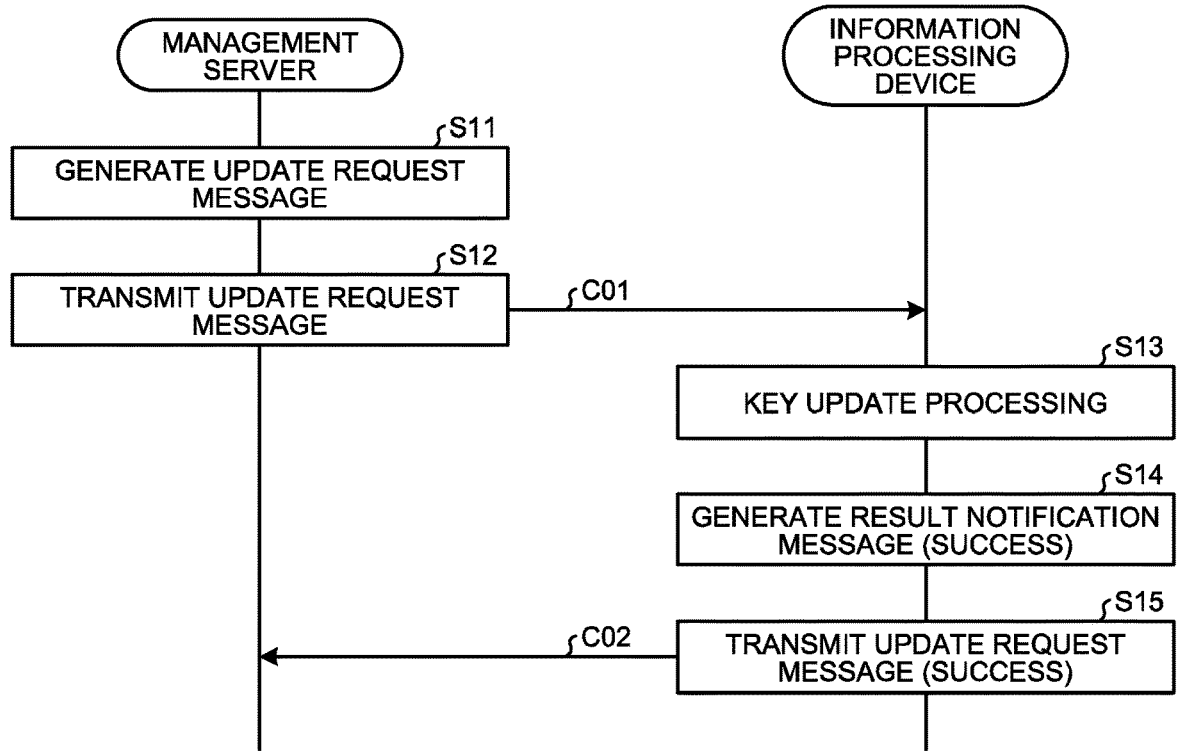
FIG. 4 is a process sequence diagram applied when the information processing system has been successfully updated.

FIG. 4 is a process sequence diagram applied when the information processing system has been successfully updated.

Figure 5:
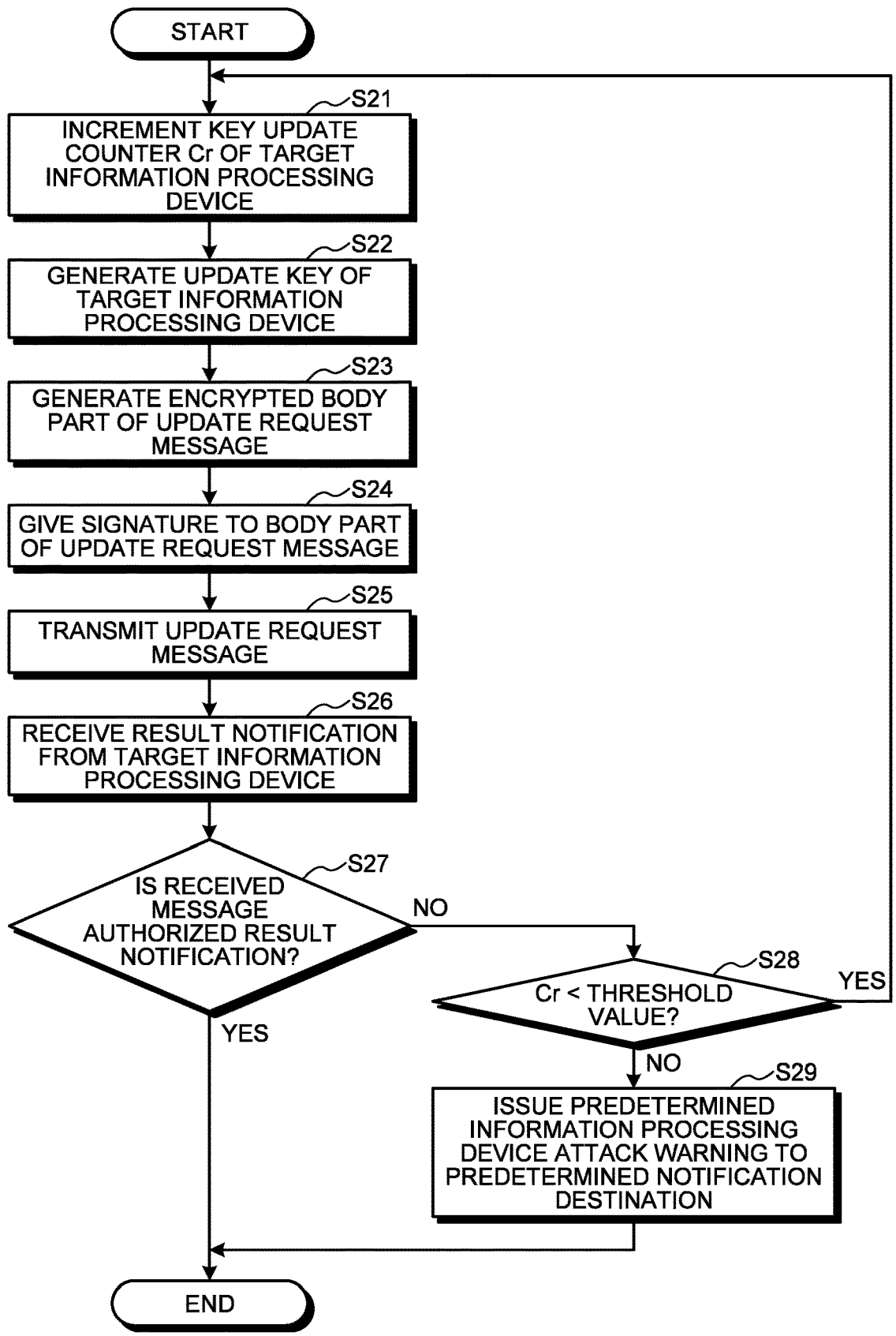
FIG. 5 is a process flowchart of an update request of a management server.

FIG. 5 is a process flowchart of an update request of a management server.

As illustrated in FIG. 4, the management server 13 generates an update request message (S11). In the processing of generating an update request message, as illustrated in FIG. 5, the management server 13 increments a key update counter Cr of the information processing device 11A (S21).

This key update counter Cr is incremented by the management server 13 every time an update request message is sent. For example, in a case where an initial value of the key update counter Cr is 1, an increment value is 1, and an update request last time is the 25th update request, the key update counter Cr=26 after the increment.

Next, the management server 13 updates a target secret key, and generates an update secret key (S22).

Subsequently, the management server 13 generates a body part of an update request message C01 (S23). The body part of this update request message C01 includes a value of the key update counter Cr as update order data.

Moreover, the management server 13 gives a signature to the update request message C01 by using a secret key that is paired with the server public key SK (S24).

Subsequently, the management server 13 transmits the update request message C01 having the signature to the information processing device 11A (S12, S25).

Figure 6:
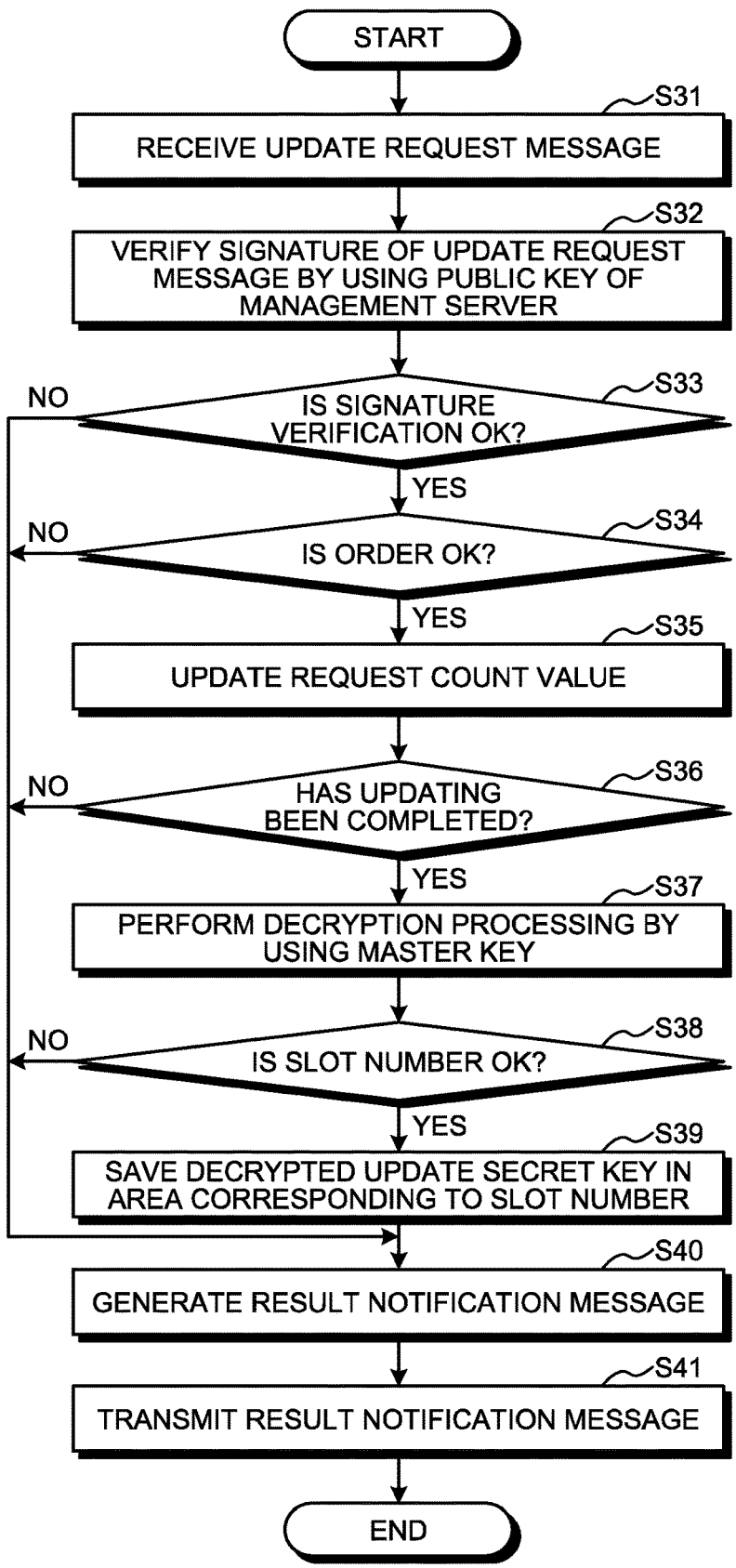
FIG. 6 is a process flowchart applied when update request processing of the information processing device is executed.

FIG. 6 is a process flowchart applied when update request processing of the information processing device is executed.

When the MCU 20 of the information processing device 11A receives the update request message C01 having the signature through the communication network 14 (S31), the MCU 20 verifies the signature of the update request message C01 by using the public key SK of the management server 13 (S32).

Subsequently, the MCU 20 of the information processing device 11A determines validity of the signature (S33).

After the signature verification fails (S33; No), the MCU 20 causes the process to proceed to S40.

After the signature verification succeeds (S33; Yes), the MCU 20 compares a value of the update order data (Cr) included in the update request message C01 with the update request count value CT, and determines whether or not the update order is correct (S34).

In a case where the value of the update order data (Cr) is lower than or equal to the update request count value CT (S34; No), the MCU 20 of the information processing device 11A determines that the update order is not correct, and causes the process to proceed to S40 without performing update secret key decryption processing.

In a case where the value of the update order data (Cr) is larger than the update request count value CT (S34; Yes), the MCU 20 of the information processing device 11A determines that the update order is correct, and updates the update request count value CT to the value of the update order data (Cr) (S35).

Subsequently, the information processing device 11A determines whether or not updating of the update request count value CT has been completed (S36).

In a case where updating of the update request count value CT has not been completed (S36; No), the MCU 20 of the information processing device 11A determines that authorized processing is not performed, and causes the process to proceed to S40 without performing update secret key decryption processing.

In a case where updating of the update request count value CT has been completed (S36; Yes), the MCU 20 of the information processing device 11A performs decryption processing by using a master key that is held by the information processing device 11A (S37).

Subsequently, the MCU 20 of the information processing device 11A determines whether or not a slot number is authorized, the slot number having been instructed for the purpose of storing the update secret key obtained by the decryption processing (S38). Specifically, a determination is made as to whether or not the slot number corresponds to a predetermined storage position corresponding to the secret key to be updated.

In a case where it has been determined that the instructed slot number is not authorized (S38; No), the MCU 20 discards the sequence number and slot number of the update key, and then causes the process to proceed to S40.

In a case where the instructed slot number is authorized (S38; Yes), the MCU 20 saves the decrypted update secret key in an area of the storage unit 31 corresponding to the instructed slot number (S39).

Subsequently, the MCU 20 generates a response signature by using a body of a result notification message C02 corresponding to success in updating, and the secret key that is paired with the own public key, and generates the result notification message C02 into which these are integrated (S40).

Subsequently, the MCU 20 of the information processing device 11A transmits the generated result notification message C02 to the management server 13 through the communication network 14 (S41).

The management server 13 receives the result notification message C02 from the information processing device 11A (S26).

Subsequently, the management server 13 checks the signature and the contents by using the public key of the information processing device 11A, and thereby determines whether or not the result notification message C02 is the result notification message C02 corresponding to success in authorized updating (S27). In this case, the result notification message C02 is the result notification message C02 corresponding to success in authorized updating (S27; Yes), and therefore the process ends.

Next, processing performed when updating of the information processing system has been failed will be described. The description below will also be made taking as example a case where a target information processing device of an update request of a secret key is the information processing device 11A. It should be noted that explanation of the same processing as that performed at the time of success in updating will be omitted.

Figure 7:
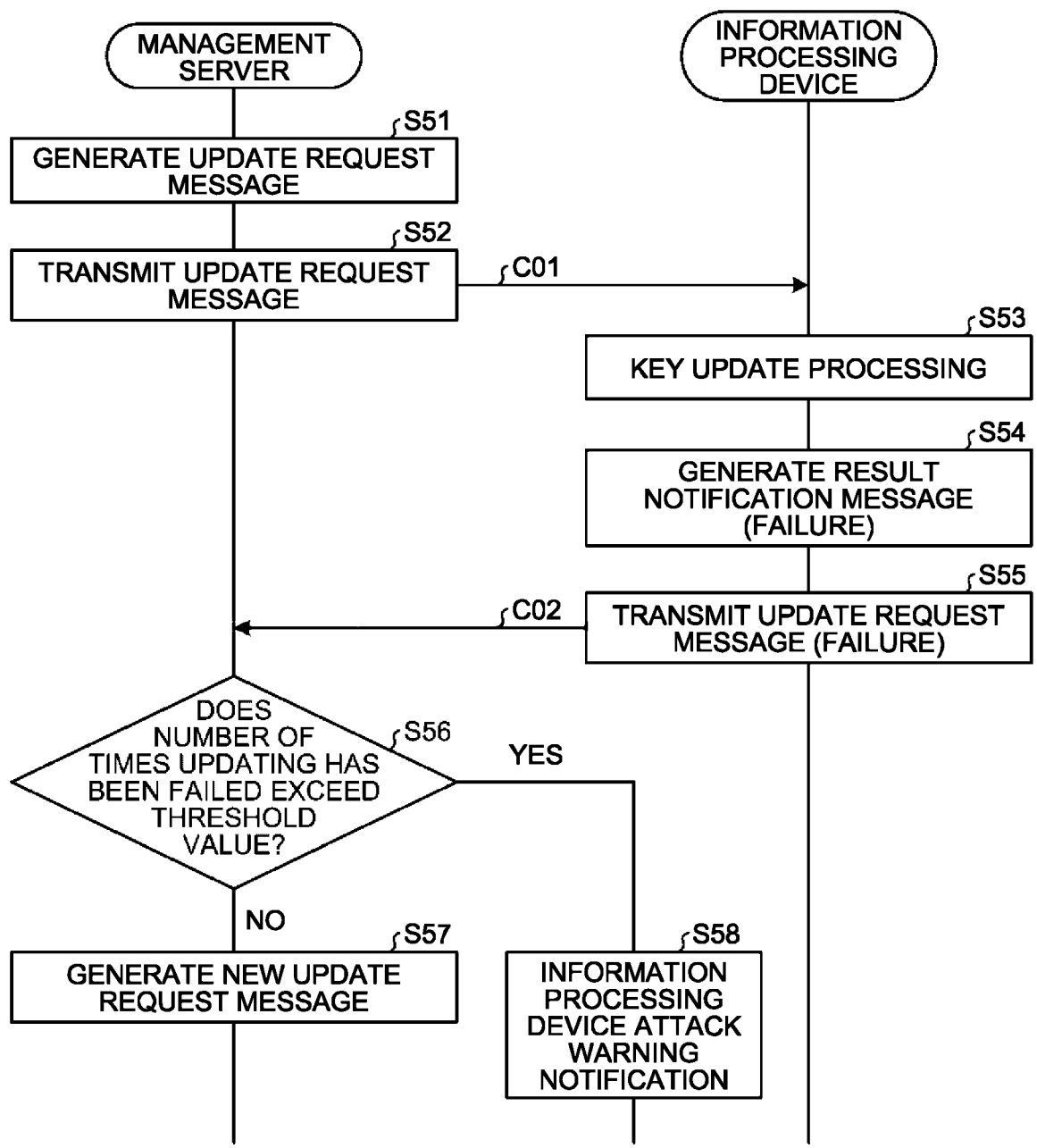
FIG. 7 is a process sequence diagram applied when updating of the information processing system has been failed.

FIG. 7 is a process sequence diagram applied when updating of the information processing system has been failed.

As illustrated in FIG. 7, the management server 13 generates an update request message (S51). In the processing of generating an update request message, the management server 13 performs processing of S21 to S25 illustrated in FIG. 5, and thereby transmits the update request message C01 having the signature to the information processing device 11A.

In a case where it is determined, from a determination result obtained by the processing in S33, S34, S36 and S38, that updating of the information processing system 10 has been failed, the information processing device 11A generates a response signature by using a body of a result notification message C02 corresponding to the failure in updating, and the secret key that is paired with the own public key. Subsequently, the information processing device 11A generates the result notification message C02 into which the body of the result notification message C02 corresponding to the failure in updating, and the response signature are integrated (S40).

Subsequently, the information processing device 11A transmits the generated result notification message C02 to the management server 13 through the communication network 14 (S41, S55).

The management server 13 receives the result notification message C02 (S26).

Subsequently, the management server 13 checks the signature and the contents by using the public key of the information processing device 11A, and thereby determines whether or not the result notification message C02 is the result notification message C02 corresponding to success in authorized updating (S27). In this case, since the result notification message C02 is not an authorized update success response message (S27; No), in other words, since the result notification message C02 is the result notification message C02 corresponding to failure in updating, the management server 13 determines whether or not a value of the key update counter Cr corresponding to the information processing device 11A is lower than or equal to an allowable threshold value (S28).

In a case where the value of the key update counter Cr is lower than the allowable threshold value (S28; Yes), the management server 13 causes the process to proceed to S21 again to perform similar processing, and transmits the message C01 having the signature. In this case, the update order data (Cr) included in the message having the signature that is newly transmitted by the management server 13 has a new value (value after increment).

In a case where the value of the key update counter Cr is larger than or equal to the allowable threshold value (S28; No), the management server 13 notifies a predetermined notification destination (for example, a system monitoring server, etc.) of a warning that the information processing device 11A is attacked by an attack such as a side-channel attack (S29), and causes the process to end.

As shown in the above explanation, according to the present embodiment, by updating order comparison information when an authorized update request message has been received, irrespective of whether or not processing corresponding to the update request message has been successfully completed, even if an update request message corresponding to the same order comparison information has been received thereafter, the update request message is not handled as an authorized update request message.

Therefore, no opportunity of a side-channel attack is given to an attacker, which can improve security, and build a reliable information processing system.

The information processing device according to the present embodiment may have a mode (a hardware configuration) as an ordinary computer provided with: a control device such as a CPU; a storage device such as a Read Only Memory (ROM) or a RAM; an external storage device such as an HDD; a display device such as a display unit; and an input device such as a keyboard or a mouse, or may have a mode (a hardware configuration) as a semiconductor chip provided with an input-output interface, and a communication interface.

The example has been shown in which in the processing in S40, the information processing device 11A generates a response signature for the result notification by using the secret key paired with the public key of the information processing device 11A, and the management server 13 verifies the response signature in the processing in S27. In comparison with the management server 13, there is a higher possibility that the information processing device 11A will be subjected to a side-channel attack, and the information processing device 11A has lower processing capability. Taking the above into consideration, the signature generation based on being paired with the public key of the information processing device 11A may be replaced with signature generation by message authentication code (MAC) based on a message authentication common key shared with the management server 13 beforehand. In this case, signature verification of the public key performed by the management server 13 is also replaced with MAC verification. This is because in general, public key processing tends to be weak in side-channel attacks in comparison with common key processing. Accordingly, by applying common-key based message authentication to the information processing device 11A having difficulty in being operated in a physically safe place, a threat of an attack and a processing load can be reduced.

A program that is executed in the information processing device according to the present embodiment is provided by being recorded, as a file having an installable or executable format, on a computer-readable recording medium including: a disk such as a Digital Versatile Disk (DVD); a USB memory; and a semiconductor memory device such as a Solid State Drive (SSD).

In addition, the program that is executed in the information processing device according to the present embodiment may be configured to be provided by being stored in a computer connected to a network such as the Internet, and then by being downloaded via the network. Moreover, the program that is executed in the information processing device according to the present embodiment may be configured to be provided or distributed via a network such as the Internet.

In addition, the program according to the present embodiment may be configured to be provided by being built into a ROM or the like beforehand.

The program that is executed in the information processing device according to the present embodiment has a module configuration that includes the above-described units (the storage unit, the update unit, the verification unit, . . . ); and as actual hardware, reading and executing the program from the above-described storage medium by the CPU (processor) causes the above-described units to be loaded on a main storage unit, and consequently the storage unit, the update unit, and the verification unit are generated on the main storage unit.

Although the embodiments of the present invention have been explained, these embodiments are merely provided for an exemplifying purpose, and do not intend to limit the scope of the present invention. These novel embodiments can be carried out with other various configurations, and various abbreviations, substitutions, or modifications can be made without departing from the gist of the present invention. These embodiments and modifications thereof are embraced by the scope and the gist of the present invention, and are also embraced by the present invention described in claims and equivalents thereof.

What is claimed is:

1. An information processing device that updates its own secret key according to an update request including an encrypted updated key and an updated request order information that enables identification of an order of the update request, the updated request order information being updated by incrementing request order information by a management information processing device, the information processing device comprising:
   circuitry configured to:
   store, in a nonvolatile manner, a master secret key, the secret key, and order comparison information that enables comparison of the order of the update request;
   in a case where the update request has been made, perform a comparison that compares the updated request order information and the order comparison information;
   in a case where it has been determined that the order of the update request is authorized, based on the comparison, by determining that an order of the updated request order information is larger than the order comparison information:
      update the order comparison information to information corresponding to the updated request order information before update processing of the secret key is performed by using the master secret key and perform the update processing of the secret key, the update processing of the secret key including decrypting, using the master secret key, the encrypted updated key associated with the updated request to recover the updated secret key; and
   in a case where it has been determined that the order of the update request is not authorized, based on the comparison, by determining that the order of the updated request order information is lower than or equal to the order comparison information:
      proceed without performing the update processing of the secret key,
   wherein the management information processing device limits the order of the update request to an allowed threshold and issues a notification warning to the information processing device if the order of the update request exceeds the allowed threshold.

2. The information processing device according to claim 1, wherein
   the update request is transmitted through a communication network by the management information processing device,
   the circuitry is configured to verify a signature by using a public key of the management information processing device, the signature having been given to the update request, and
   in a case where the verification has been succeeded, the circuitry is configured to compare the updated request order information and the order comparison information.

3. The information processing device according to claim 1, wherein the circuitry is configured to replace the order comparison information with the updated request order information.

4. An information processing system comprising:
   a management server device that includes circuitry configured to:

update a request order by incrementing request order information, generate an update request including an encrypted updated key and updated request order information that enables identification of an order of the update request, and transmit the generated update request; and an information processing device that is connected to the management server device through a communication network, updates its own secret key according to the update request, and includes circuitry configured to:

store, in a nonvolatile manner, a master secret key, the secret key, and order comparison information that enables comparison of the order of the update request, in a case where the update request has been made, perform a comparison that compares the updated request order information and the order comparison information, in a case where it has been determined that the order of the update request is authorized, based on the comparison, by determining that the order of the updated request order information is larger than the order comparison information:

update the order comparison information to information corresponding to the updated request order information before update processing of the secret key is performed by using the master secret key and perform the update processing of the secret key, the update processing of the secret key including decrypting, using the master secret key, the encrypted updated key associated with the updated request to recover the updated secret key, and in a case where it has been determined that the order of the update request is not authorized, based on the comparison, by determining that the order of the updated request order information is lower than or equal to the order comparison information:

proceed without performing the update processing of the secret key, wherein the circuitry of the management server device is configured to limit the order of the update request to an allowed threshold and issue a notification warning to the information processing device if the order of the update request exceeds the allowed threshold.

5. The information processing system according to claim 4, wherein the update request is transmitted through the communication network by the management server device, the circuitry of the information processing device is configured to verify a signature by using a public key of the management server device, the signature having been given to the update request, and in a case where the verification has been succeeded, the circuitry of the information processing device is configured to compare the updated request order information and the order comparison information.

6. The information processing system according to claim 4, wherein the circuitry of the information processing devices is configured to replace the order comparison information with the updated request order information.

7. A method for controlling an information processing device that updates its own secret key according to an update request including an encrypted updated key and an updated request order information that enables identification of an order of the update request, the updated request order information being updated by incrementing request order information by a management information processing device, the method comprising:

storing, by the information processing device in a nonvolatile manner, a master secret key, the secret key, and order comparison information that enables comparison of the order of the update request;

in a case where the update request has been made, comparing the updated request order information and the order comparison information;

in a case where it has been determined that the order of the update request is authorized, based on the comparing, by determining that an order of the updated request order information is larger than the order comparison information:

updating the order comparison information to information corresponding to the updated request order information before update processing of the secret key is performed by using the master secret key and performing the update processing of the secret key, the update processing of the secret key including decrypting, using the master secret key, the encrypted updated key associated with the updated request to recover the updated secret key; and in a case where it has been determined that the order of the update request is not authorized, based on the comparing, by determining that the order of the updated request order information is lower than or equal to the order comparison information:

proceeding without performing the update processing of the secret key, wherein the management information processing device limits the order of the update request to an allowed threshold and issues a notification warning to the information processing device when the order of the update request exceeds the allowed threshold.

8. The method for controlling the information processing device according to claim 7, wherein the update request is transmitted through a communication network by the management information processing device, the method includes verifying a signature by using a public key of the management information processing device, the signature having been given to the update request, and in a case where the verification has been succeeded, the comparing the updated request order information and the order comparison information is performed.

9. The method for controlling the information processing device according to claim 7, further comprising replacing the order comparison information with the updated request order information.

* * * * *